United States Patent [19]

Krumbein

[11] 4,049,340
[45] Sept. 20, 1977

[54] FILM WIND-UP ARRANGEMENT FOR MOTION-PICTURE CAMERAS

[75] Inventor: Fritz Krumbein, Stuttgart-Mohringen, Germany

[73] Assignee: Robert Bosch GmbH, Stuttgart, Germany

[21] Appl. No.: 661,335

[22] Filed: Feb. 25, 1976

[30] Foreign Application Priority Data

Mar. 5, 1975    Germany ............................ 2509492

[51] Int. Cl.² .............................................. G03B 1/00
[52] U.S. Cl. ...................................... 352/166; 226/25; 242/191
[58] Field of Search ...................... 352/72, 166, 174; 242/191; 226/25

[56] References Cited

U.S. PATENT DOCUMENTS

| | | | |
|---|---|---|---|
| 3,630,467 | 12/1971 | Hayami | 352/166 |
| 3,811,761 | 5/1974 | Krumbein | 352/166 |
| 3,920,198 | 11/1975 | Sutliff | 352/72 |
| 3,945,719 | 3/1976 | Iida | 352/72 |

FOREIGN PATENT DOCUMENTS 250,173    10/1966    Austria ............................... 352/166

*Primary Examiner*—Monroe H. Hayes
*Attorney, Agent, or Firm*—Michael J. Striker

[57] ABSTRACT

The motion-picture camera includes a prime mover, a film wind-up member, and a torque-equalizing clutch arrangement coupling the film wind-up member to the prime mover for transmitting torque to the latter. The clutch arrangement includes an automatic disengaging device which automatically disengages the clutch arrangement when the torque being transmitted by the clutch arrangement exceeds a preselected value. The automatic disengaging device includes a worm wheel connected to and driving the film wind-up member, a worm screw driving the worm wheel and driven by the disengageable part of the clutch arrangement. The worm screw is so mounted that as it drives the worm wheel it simultaneously tends to move in a direction causing the disengageable part of the clutch arrangement to become disengaged. The automatic disengaging device furthermore includes a biasing spring which exerts upon the worm screw a force counteracting the tendency of the worm screw to move in the direction associated with clutch disengagement.

15 Claims, 2 Drawing Figures

FILM WIND-UP ARRANGEMENT FOR MOTION-PICTURE CAMERAS

BACKGROUND OF THE INVENTION

The invention relates to the film wind-up transmission of motion-picture cameras, particularly the type including a torque-equalizing clutch connected intermediate the drive motor and the drive wheel for the film wind-up reel.

Film wind-up transmissions of the type in question generally incorporate clutches which automatically disengage when the torque which they are transmitting reaches a value corresponding to the torque required to drive the film wind-up reel.

It is known to use friction clutches for this purpose. However, the value of the limit torque, the torque which when being transmitted by the friction clutch causes the clutch to automatically disengage, varies undesirably as a function of many external factors, such as humidity, temperature, aging, and the like. This variability of the value of the limit torque usually interferes greatly with proper operation of the camera. For example, image fluttering and wind-up malfunctions are two of the problems which may develop. Such friction clutches are particularly ill suited for the transmission of a uniform, maximum transmissible torque when the motion-picture camera in question is of the type designed to operate at a plurality of selectable, markedly different speeds. For example, switching over from 19 frames/second to 54 frames/second can produce changes in the value of the limit torque causing problems in the operation of the camera at both film speeds.

It is also known to make use of pawl motion-imparting mechanisms. When these are used for the standard film speed of 18 frames/second, or even possibly also 24 frames/second, the interfering factors mentioned above as detrimentally affecting the reliability of friction clutches are avoided. However, for higher film speeds such pawl mechanisms are not acceptable for practical reasons. Also, they are loud and excessively jerky in operation.

In general, both conventional friction clutches and pawl-type motion-imparting mechanisms are not satisfactory when, as a further requirement of operation, the motion-picture camera in which they are to be used is to be capable of operating with more than one type of film (e.g., silent film or sound film cassettes) requiring different respective film wind-up torques and accordingly different limit torques for the automatically disengaging clutches.

A friction clutch for film wind-up transmission is known whose limit torque can change in dependence upon the loading upon the clutch. In this construction, the pressure with which the frictional engaging parts of the clutch must be pressed together to establish a torque-transmitting engagement is limited by means of a fixed stop. Accordingly, with this construction, too, a changeover from one limit torque to another is not possible. Additionally, this particular construction exhibits all those disadvantages of friction clutches already discussed.

SUMMARY OF THE INVENTION

It is the general object of the invention to provide a motion-picture camera with a film wind-up transmission whose operation is practically independent of variations in the frictional coefficients of those components of the transmission which transmit force by friction.

It is a related object to provide a motion-picture camera with a film wind-up transmission which is capable of transmitting film wind-up torque at a very uniform value for all film speeds and film types at which and with which the camera can be used.

Another object is to provide a motion-picture camera with a film wind-up transmission which is very quiet in its operation.

These objects, and others which will become more understandable from the description, below, of preferred embodiments, can be met, according to one advantageous concept of the invention, by using a clutch arrangement which automatically disengages when the torque being transmitted by the clutch exceeds a certain value, with the clutch arrangement including a worm screw which drives a worm wheel which in turn drives a film wind-up reel. The worm screw is driven by a disengageable part of the clutch arrangement. Because of the slope of the threads of the worm screw, the torque applied to the worm screw is partially converted into an axial force tending to longitudinally shift the worm screw in a direction causing the frictional engaging elements of the clutch arrangement to become disengaged. This tendency of the worm screw to so shift is counteracted by biasing means operative for exerting upon the worm screw a biasing force which prevents such shifting from occurring. The worm screw cannot shift to an extent causing the clutch to disengage until the torque being transmitted by the clutch has reached the limit value. This limit value is dependent upon the force exerted upon the worm screw by the biasing means.

According to an advantageous concept of the invention, the biasing means is fixedly mounted on a portion of the housing of the motion-picture camera and the biasing force which it exerts can be adjusted, even when the camera is actually in operation.

For the torque-equalizing clutch arrangement, use is preferably made of an arrangement including a friction clutch capable of transmitting a torque which is as high as possible compared to the pressure with which the frictional engaging elements of the clutch must be pressed together to establish a torque-transmitting engagement.

According to another advantageous concept of the invention, there is a ratio of about 1 : 10 between the force (expressed in ponds) with which the frictional engaging elements must be pressed together to establish torque-transmissive engagement, on the one hand, and, on the other hand, the reaction force (expressed in ponds) of the worm screw operative in direction tending to cause the frictional engaging elements of the clutch to become disengaged.

According to a further concept of the invention, the mounting member which mounts the spring which counteracts the reaction force of the worm screw is preferably designed to be adjustable in steps. This adjustability makes for adjustability of the limit torque of the clutch arrangement and thereby adjustability of the film wind-up torque. Changes in the value of the film wind-up torque to be employed can be made automatically or by means of manually activated selectors. This may be necessary, for example, when switching over from silent-film operation to sound-film operation.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
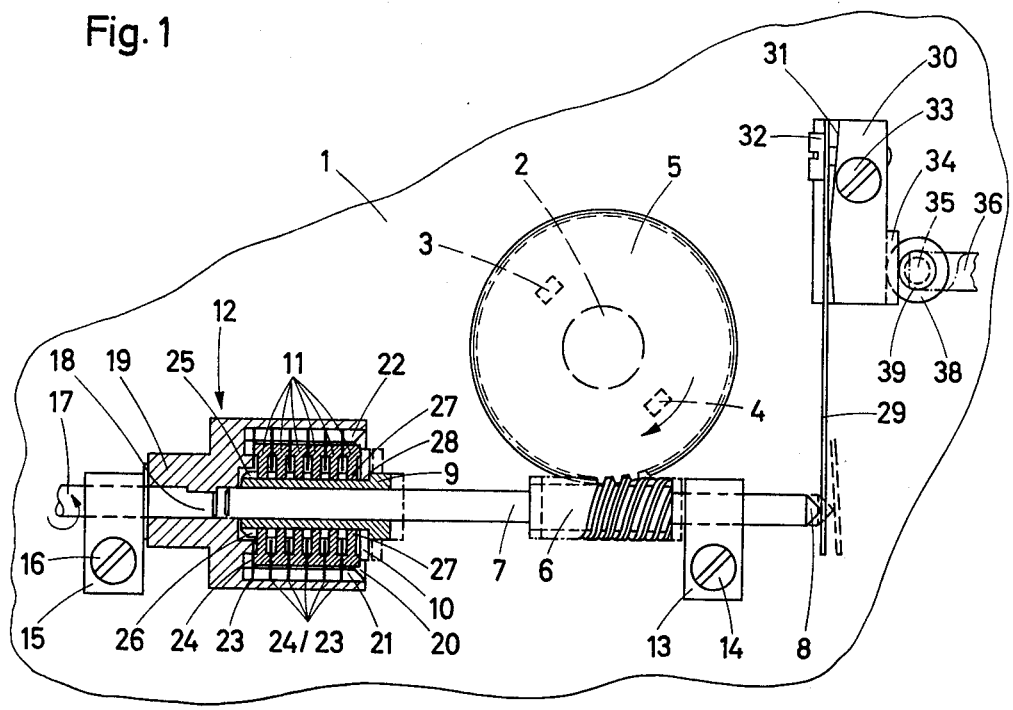
FIG. 1 depicts a portion of a motion-picture camera and the film wind-up transmission with which it is provided.

Numeral 1 designates the housing of a motion-picture camera. Mounted in housing 1, on a common shaft 2 are a worm wheel 5 and a drive disk provided with drive pegs 3 and 4 adapted to engage and drive a film reel.

Worm wheel 5 is engaged and driven by a worm screw 6, which in turn is mounted on a shaft 7. One end of shaft 7 is a pointed end 8, whereas the other end of the shaft carries parts 9, 10, and 11 of a multiple-disk clutch 12. At its right end, shaft 7 is mounted for rotation on a support 13, located intermediate worm screw 6 and pointed end 8, and fixedly secured to a wall of housing 1 by a screw 14. Another such support 15, fixedly secured by a screw 16, mounts for rotation a drive shaft 17 coaxial with shaft 7. The right end of drive shaft 17 is received within a casing 19. Casing 19 is provided with an interior bore 20 into the peripheral wall of which are milled, or otherwise formed, two diametrally opposed, axially extending grooves 21 and 22. Arranged inside bore 20 is a plurality of clutch disks 24 the noses of which project radially outward into the longitudinal grooves 21 and 22. In this way, grooves 21, 22 serve both to position and guide the clutch disks 24 with its noses 23 and also to establish a torque-transmitting connection between clutch casing 19 and clutch disks 24. Casing 19 also surrounds parts 9, 10, and 11 of the multiple-disk clutch 12 on shaft 7.

Part 9 is a sleeve which is fixedly mounted on shaft 7, non-rotatable relative to the latter. Provided in the outer cylindrical surface of sleeve 9 are two further longitudinal grooves 25, 26, likewise disposed diametrally opposite each other. Grooves 25, 26 receive the radially inward extending noses 27 of the friction disks 11 of the multiple-disk clutch 12, and furthermore serve to establish a torque-transmitting connection between sleeve 9 and friction disks 11. Sleeve 9, at the right ends of the longitudinal grooves 25, 26 thereon, is provided with an annular groove 28 which receives part 10 of the multiple-disk clutch 12. Part 10 is an axially shiftable disk.

Bearing against the pointed end 8 of shaft 7 is a leaf spring 29, whose mounting member 30 is provided with a roof-shaped (angled) bearing surface 31. An adjusting screw 32 passes through a hole at the top end of leaf spring 29 and is screwed into a threaded bore in mounting member 30. By turning adjusting screw 32, the leaf spring 29 can be made to bear more or less heavily against roof-shaped bearing surface 31. Spring mounting member 30 is in turn mounted on housing 1 by means of a mounting screw 33. Mounting screw 33 is so dimensioned and arranged as to be capable of serving as a pivot relative to which spring mounting member 30 can be turned.

Figure 2:
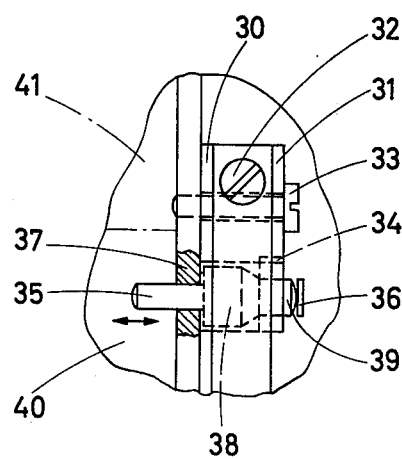
FIG. 2 is a partially sectioned view of the components shown in the upper right corner of FIG. 1.

Located opposite a projecting nose 34 of spring mounting member 30 is a control peg 35. Control peg 35 is guided through a bore in the wall of housing 1. As can be seen in FIG. 2, the portion of control peg 35 intermediate its ends is enlarged to form a collar 38 which limits the extent to which control peg 35 can move leftward, as viewed in FIG. 2. A leaf spring 36 bears against the right end face of control peg 35, urging the peg leftward, so that the left end face 37 of collar 38 is pressed against that housing wall on which is mounted member 30. Larger-diameter collar 38 merges into a smaller-diameter end portion 39 via an intermediate conical transition section. The free end of control peg 35 projects through the wall of housing 1 into a cassette chamber 40 defined by housing 1.

If, as shown in FIGS. 1 and 2, a cassette 41 inserted into cassette chamber 40 does not contact control peg 35, then the projecting nose 34 of mounting member 30 bears against the smaller-diameter cylindrical end portion 39 of control peg 35, pressed thereagainst under the action of leaf spring 29. The film provided in the cassette 41 requires for its transport a relatively low transmission torque.

If the inserted cassette displaces the control peg 35 rightward (as viewed in FIG. 2), the hose 34 of member 30 will now be engaged by the conical portion of control peg 35. This will cause mounting member 30 to pivot clockwise (as viewed in FIG. 1) about mounting screw 33, thereby increasing the force with which leaf spring 29 bears against pointed end 8 of shaft 7. This results in a rise of the transmitted torque. The increased torque overcomes easily and reliably the greater frictional resistance associated with the inserted cassette in question.

If a film cassette 41 has been inserted into the cassette chamber 40 and the camera then set into operation, the drive shaft 17 drives shaft 7 via the multiple-disk coupling 12. The worm screw 6 on shaft 7 converts the torque transmitted by these shafts into a force effecting rotation of worm wheel 5, and accordingly turning of the drive pegs 3 and 4 for the film reel. So long as the torque transmitted by the drive pegs 3, 4 remains lower than the requisite wind-up torque, the transmission of force continues in the manner which has been described.

As soon as the wind-up torque exceeds the preselected limit value, the worm screw 6 begins to screw alongside worm wheel 5 against the opposition of leaf spring 29. In the course of this screwing movement, the friction disk 10 of the multiple-disk clutch 12 moves away from the neighboring one of clutch disks 11. As a result, the frictional coupling between drive shaft 17 and shaft 7 terminates. Immediately the drive pegs 3, 4 come to a standstill.

The numerical value of the maximum torque (expressed in centimeter-ponds) which the clutch 12 is capable of transmitting is preferably equal to at least eight times the numerical value of the force (expressed in ponds) with which the disks of clutch 12 must be pressed together to effect torque transmission.

Preferably, the ratio between the force (expressed in ponds) with which the frictional engaging elements must be pressed together to establish torque-transmitting engagement, on the one hand, and, on the other hand, the reaction force (expressed in ponds) exerted upon the worm screw 6 by worm wheel 5 in a direction causing the frictional engaging elements of the clutch 12 to disengage is about 1 : 10. For example, assume that the friction disks of the clutch must be pressed together with a force of at least 10 ponds if transmission of torque is to occur. The leaf spring 29 exerts upon worm screw 6 a leftward axial force, tending to maintain the clutch 12 engaged. The worm wheel 5 exerts upon worm screw 6 a rightward axial reaction force tending to cause clutch 12 to become disengaged. The net force with which the disks of clutch 12 are pressed together is therefore equal to the force exerted on worm screw 6 by leaf spring 29 minus the reaction force exerted on worm screw 6 by worm wheel 5. As soon as this net leftward force falls below 10 ponds, clutch 12 becomes disengaged. If the ratio between the clutch-engaging force and the reaction force is to have the just-mentioned value of 1 : 10, then at the moment of clutch disengagement the reaction force would be equal to 100 ponds and the leaf spring force would be equal to 110 ponds.

In any event, as soon as clutch disengagement occurs, because film continues to be fed from the non-illustrated film-transport gripper, the film tension on the reel immediately terminates. Leaf spring 29 can again move shaft 7 in leftward direction, during which movement the worm wheel 5 is constrained to turn clockwise as it is driven by the worm screw now acting like a rack with respect to worm wheel 5, until finally the multiple-disk clutch becomes engaged again. The film wind-up operation resumes. This sequence of events repeats itself as often as the wind-up torque exceeds the preselected transmission torque. By means of adjusting screw 32 it is possible to finely set the value of the transmission torque, even during actual camera operation.

The sudden change of the requisite maximum wind-up torque which occurs, for example, upon a change from one cassette type to another, is effected by the control peg 35 itself, in the manner already described.

This changeover operation need not be performed, in the described manner, in automatic response to a change of cassette. Instead, it could be effected manually using a switchover lever, or other such device. For example, instead of collar 38 and smaller-diameter cylindrical end portion 39, use could be made of a non-illustrated eccentric as the abutment for the nose 34 of member 30. A control lever accessible to the user of the camera would be activated to turn the eccentric, thereby vary the angular position of member 30 and thus the threshold transmission torque.

It will be understood that each of the elements described above, or two or more together, may also find a useful application in other types of constructions differing from the types described above.

While the invention has been illustrated and described as embodied in a motion-picture camera provided with a film wind-up transmission incorporating a friction clutch, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion-picture camera, in combination, a prime mover; a film wind-up member; and a torque-equalizing clutch arrangement coupling the film wind-up member to the prime mover for transmitting torque to the latter, the clutch arrangement including automatic wind-up torque regulating means operative for continually maintaining the wind-up torque transmitted to and exerted by the film wind-up member substantially constant at a preselected value throughout the whole film wind-up operation by automatically disengaging the clutch arrangement when the wind-up torque begins to exceed the preselected value and automatically reengaging the clutch arrangement when the wind-up torque then begins to fall below the preselected value, so as to establish transmission of an intermittent wind-up torque having an average value which is substantially constant and equal to the preselected value, the automatic wind-up torque regulating means including a worm wheel connected to and driving the film wind-up member, a worm screw driving the worm wheel and driven by the disengageable part of the clutch arrangement, the worm screw being so mounted that as it drives the worm wheel it simultaneously tends to move in a direction causing the disengageable part of the clutch arrangement to become disengaged, and biasing means for exerting upon the worm screw a force counteracting the tendency to move in such direction.

2. In a motion-picture camera as defined in claim 1, the biasing means being an adjustable biasing means adjustable for selecting the biasing force exerted upon the worm screw and thereby the transmitted torque at which the clutch arrangement automatically disengages.

3. In a motion-picture camera as defined in claim 1, the camera having a camera housing and the biasing means being fixedly mounted on the camera housing, and the biasing means being adjustable during actual transmission of torque by the clutch arrangement during camera operation for selecting the biasing force exerted upon the worm screw and thereby the transmitted torque at which the clutch arrangement automatically disengages.

4. In a motion-picture camera as defined in claim 1, the clutch arrangement being a friction clutch arrangement comprised of driving and driven parts disengageable from each other, the frictional torque-transmitting connection between the driving and driven parts being established by pressing the parts together, the torque (in centimeter-ponds) transmittable from the driving to the driven parts when those parts are frictionally engaged being as high as possible compared to the force (in ponds) with which the parts must be pressed together to establish a frictional engagement sufficient to effect torque transmission.

5. In a motion-picture camera as defined in claim 1, the clutch arrangement being a friction clutch arrangement comprised of driving and driven parts disengageable from each other, the worm wheel when driven by the turning worm screw exerting upon the latter a reaction force opposing the force exerted upon the worm screw by the biasing means, and the reaction force (in ponds) measured at the moment of disengagement of the friction clutch arrangement being equal to about 10 times the force (in ponds) with which the parts of the clutch arrangement must be pressed together to effect torque transmission.

6. In a motion-picture camera, as defined in claim 1, the clutch arrangement being a friction clutch arrangement comprised of frictionally engageable driving and driven parts, the frictional torque-transmitting connection between the driving and driven parts being established by pressing the parts together, the clutch arrangement further including a longitudinally shiftable shaft, the worm screw being mounted on the shaft for effecting longitudinal shifting of the shaft, and the shaft carrying at least some of the frictionally engageable parts.

7. In a motion-picture camera as defined in claim 1, the clutch arrangement being a disk clutch arrangement.

8. In a motion-picture camera as defined in claim 1, wherein the clutch arrangement is a friction clutch comprised of a driven part and a disengageable driving part and frictional engaging members carried on the parts, the worm screw being carried on the driven part on a worm-screw shaft, the driving part carrying a guide casing for the at least one frictional engaging member of the driven part, and the worm screw being provided on a shaft, further including a stationary mounting member mounting the shaft for rotation at the end thereof remote from the driving part.

9. In a motion-picture camera as defined in claim 8, wherein the end of the shaft remote from the driving part of the clutch arrangement is a pointed end, and wherein the biasing means comprises a leaf spring bearing upon the pointed end of the shaft and in that way counteracting the tendency of the worm screw to move in a direction such as could cause clutch disengagement.

10. In a motion-picture camera as defined in claim 9, wherein the biasing means further includes an adjustable mounting member mounting the leaf spring, the mounting member being turnable to a plurality of different positions in which the leaf spring exerts upon the pointed end of the shaft different respective biasing forces corresponding to different film wind-up torque requirements.

11. In a motion-picture camera as defined in claim 10, wherein the mounting member for the leaf spring is manually settable to the different positions thereof.

12. In a motion-picture camera as defined in claim 10, further including means for automatically selecting the biasing force exerted by the biasing means in dependence upon an operating parameter of the motion-picture camera.

13. In a motion-picture camera as defined in claim 12, wherein the motion-picture camera includes a cassette chamber for the insertion of film cassettes, and wherein the means for automatically selecting the biasing force comprises means responsive to the presence of cassettes in the cassette chamber.

14. In a motion-picture camera as defined in claim 10, wherein the leaf spring is continuously adjustable relative to the mounting member therefor.

15. In a motion-picture camera, in combination, a prime mover, a film wind-up member, and a torque-equalizing clutch arrangement coupling the film wind-up member to the prime mover for transmitting torque to the latter, the clutch arrangement comprising automatic wind-up torque regulating means operative for continually maintaining the wind-up torque transmitted to and exerted by the film wind-up member substantially constant at a preselected value throughout the whole film wind-up operation by automatically disengaging the clutch arrangement when the wind-up torque begins to exceed the preselected value and automatically reengaging the clutch arrangement when the wind-up torque then begins to fall below the preselected value, so as to establish transmission of an intermittent wind-up torque having an average value which is substantially constant and equal to the preselected value, the wind-up torque regulating means including a rotary driving part driven by the prime mover, a rotary driven part driven by the driving part and driving the film wind-up member, the driving part being movable between a first position in which it receives torque from the prime mover and a second position in which it is disengaged from the prime mover, the driven part being arranged to urge the driving part toward the second position thereof with a force which increases with increasing wind-up torque, and biasing means for urging the driving member to the first position thereof with a predetermined force which is overcome by the driven member when the wind-up torque begins to exceed the preselected value.

* * * * *